May 19, 1964   J. E. J. LAMY ETAL   3,133,421
METHOD FOR LAYING SUBMARINE PIPING
Filed Dec. 28, 1960   2 Sheets-Sheet 1
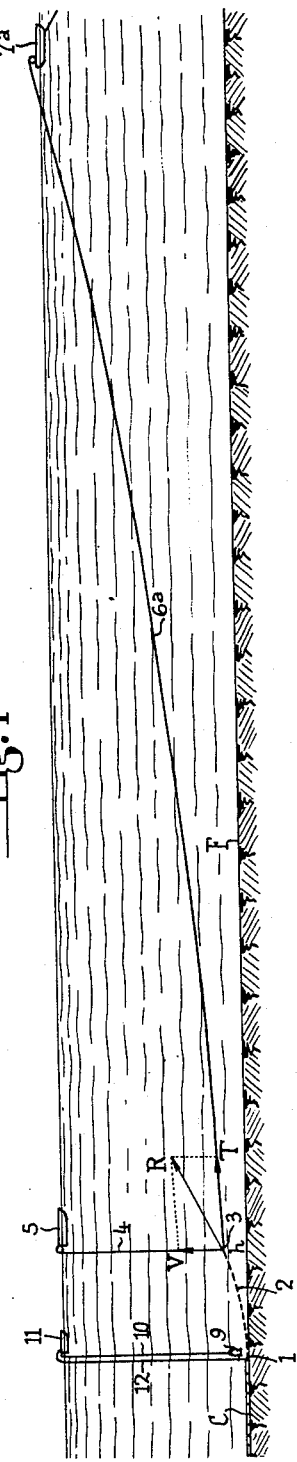
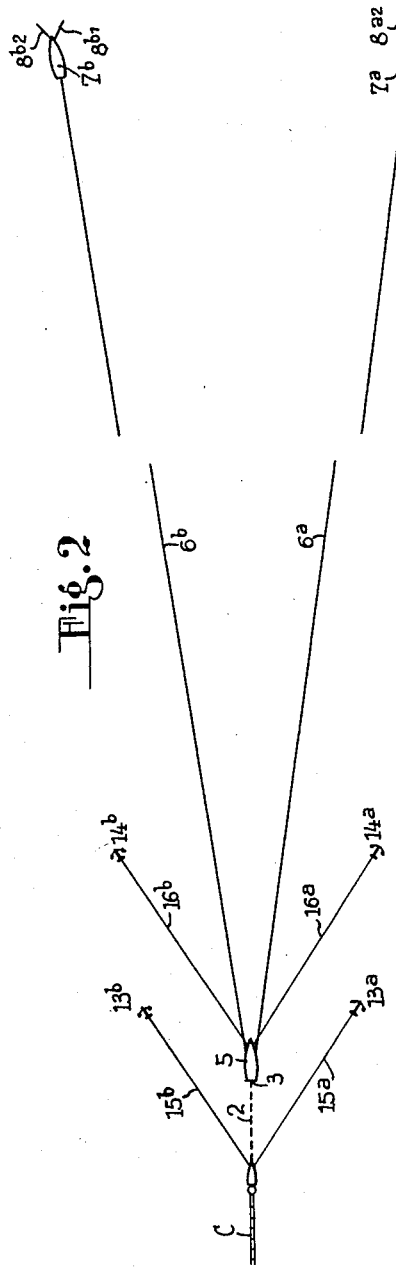

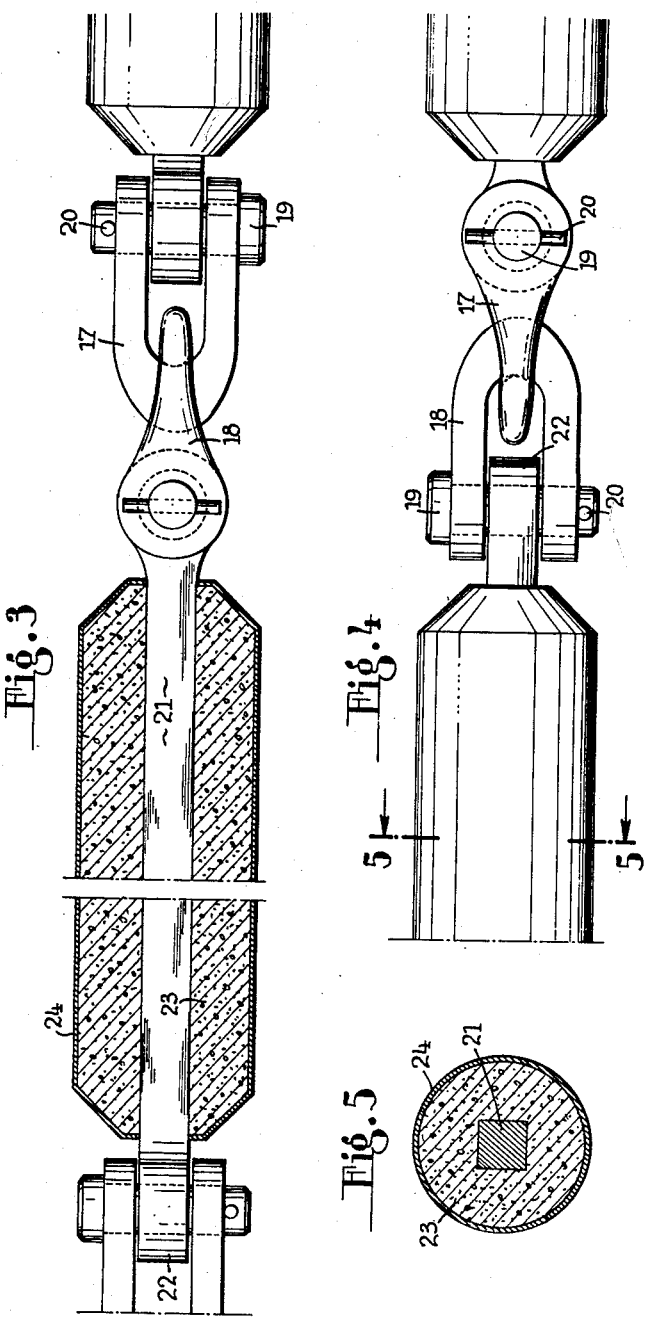

United States Patent Office 3,133,421
Patented May 19, 1964

3,133,421
METHOD FOR LAYING SUBMARINE PIPING
Jacques Edouard Jean Lamy, Fontenay-aux-Roses, and Robert Venet, Choisy-le-Roi, France, assignors to Societe d'Etudes du Transport et de la Valorisation des Gaz Naturels du Sahara S.E.G.A.N.S., Paris, France, a French body corporate
Filed Dec. 28, 1960, Ser. No. 78,971
Claims priority, application France Jan. 11, 1960
5 Claims. (Cl. 61—72.3)

The object of the present invention is to provide a method of laying a rigid elongated member, and in particular, a submarine pipe by towing this pipe along the sea bottom by means of a traction longitudinally exerted by a traction member secured at the head of the pipe.

The method used heretofore comprises the utilization of a traction member consisting of a cable resting at the bottom forwardly of the leading end of the pipe. However, this method has certain drawbacks which make it inoperative in some cases. Thus, the cable may be subjected to considerable frictional stresses in rocky areas, resulting in a substantial wear on account of the considerable length over which it has to extend. Moreover, such a cable, which is necessarily thin, can readily jam between two rocks, resulting in a possible damage, which in some cases may be serious enough to cause a rupture thereof. The consequences of such an accident would be so serious that its likelihood should not even be taken into consideration.

Finally, when passing over a hilled portion, the leading end of the pipe may be urged downwards by a cable resting on the ground and be buttressed thereon.

In order to overcome these drawbacks, it has been suggested to tow the end of the pipe at a certain distance above the sea bottom. Such a method is actually unusable, since the curvature cannot exceed a certain admitted maximum and the necessity of remaining at a curvature value lower than said maximum would require an adjustment of both the tension of the traction cable and the length thereof with an accuracy impossible to achieve under sea-working conditions.

The object of the invention is to provide a method of laying a submarine piping by towing this piping on the sea bottom, which method is free from the aforementioned drawbacks.

This method is essentially characterised in that the stress of a traction cable is transmitted to the pipe through a chain consisting of a ballasted articulated member, of which one end is connected to the end of the pipe and the other end is held at a certain distance above the bottom, so that no portion of the traction cable actually rests on the bottom, the linear weight and the length of said chain being such that the chain is capable of transmitting the tractive stress required for the advancing of the pipe, while remaining in a tangential relationship with the sea bottom at the point of attachment between this chain and the pipe, or at a point forwardly of this point of attachment.

The reckoning of the linear weight of the chain is carried out by taking into account the tractive stress to be exerted on the pipe, the vertical distance between the end of the chain and the bottom, the length of the chain, and the slope of the cable relative to the horizontal, which slope, in turn, is function of the depth of the sea bottom and the length of the cable.

A further object of the invention is to provide a device for carrying out the aforesaid method, this device being essentially characterised in that it comprises in combination: a ballasted chain secured by one of the ends thereof to the end of the pipe to be displaced, floating means enabling the other end of the chain to be held at a certain distance above the sea bottom by means of a suspension cable attached to said other end and to said floating means, and at least one traction cable one end of which is attached to said other end of the chain, the other end of this cable being attached to floating and tractive means enabling the necessary tractive stress to be applied to said cable.

Said floating means adapted to support the end of the chain is comprised by a barge.

Said floating and tractive means is comprised by a second barge hauled on anchors.

According to an alternative embodiment, the traction cable is replaced by two cables connected to the end of the chain and attached to two anchor-hauled barges.

A still further object of the invention is to provide a ballasted chain for practicing the aforesaid method, said chain being essentially characterised in that at least some of its links consist of steel bars carrying at the ends thereof loops or other pivotal elements, these bars being embedded in reinforced-concrete blocks providing ballasts the weight of which is determined to give to the chain the required linear weight for carrying out the aforesaid method.

Further features of the invention will become apparent from the ensuing description, when read in connection with the accompanying drawings in which:

FIG. 1 is a diagrammatic elevational view of one illustrative embodiment of a device suitable for the method of the invention;

FIG. 2 is a plan view of this device;

FIGS. 3 and 4 are 90° angularly spaced views of a ballasted chain according to the invention and FIG. 5 is a sectional view of this chain taken along line 5—5 of FIG. 4.

In accordance with the embodiment shown in FIGS. 1 and 2, it is desired to advance a pipe C longitudinally on a sea bottom F having only low-height obstacles thereon, which pipe is of a sturdy construction and may be of a considerable length, ranging for example from several miles to several tens of miles.

An attachment member, secured to the leading end or "head" 1 of this pipe, has attached thereto the end of a heavy ballasted chain 2, the other end of which 3 is suspended at a height $h$ above the sea bottom by means of a suspension cable 4 attached to a barge 5 so that a catenary is formed. The junction point 3 of the chain 2 and the cable 4 has attached thereto the end of a traction member which may consist of a traction cable but is preferably comprised by two traction cables $6a$, $6b$ symmetrically located with respect to the vertical plane including the chain, both these cables being secured to the point 3 and having their other ends respectively attached to two barges $7a$ and $7b$, which are haulable on their anchors (not shown) by means of a cable $8a^1$, $8a^2$.

This operating device further includes a lock-out turret 9 of the "Galeazzi" type suspended by a cable 10 to a barge 11; this turret is lowered close to the head of the pipe, which head is the specific point to be watched over. The lowering of this turret is guided by a guiding cable 12 attached to point 1 and the barge 11.

The barges 5 and 11 can follow the travel of points 1 and 3 by being hauled on their anchors $13a$, $13b$, $14a$, $14b$ by means of their cables $15a$, $15b$, $16a$, $16b$.

The chain 2 which, as will be more specifically explained later on, must have a big linear weight, is formed, as illustrated by way of example in FIGS. 3, 4 and 5, of stirrup-shaped links such as 17 and 18, having pivotally mounted thereon by means of pins 19 dowled at 20, square-sectioned rods 21 having their ends rolled and welded so as to form eyelets having the pins 19 extending therethrough.

These rods have threaded thereon ballast blocks 23 of reinforced concrete and protected by a shielding 24 of high-gauge steel plate.

The principles ruling the calculation and the operation of this device are as follows:

The pipe has of course a certain bulk density, the minimum value of which is that required to enable the pipe to withstand the cross currents, that is to say that this pipe exerts on the sea bottom a transverse friction preventing it from being drifted by cross currents.

The thus-defined bulk density permits the reckoning of the value of the horizontal tractive force to be exerted at 1 in order to cause the pipe to be longitudinally advanced. The height $h$ of the point 3 above the sea bottom can be preset, provided the depth of the sea is known at this point.

It is further possible of reckoning the maximum tension supported by the traction cables, and thus, their tensile properties and their length.

It is also possible of calculating for a chain of a given length and tangential to the bottom at point 1, the linear weight of this chain as well the maximum strain to which it is subjected, thus permitting to define the mechanical characteristics thereof.

The maximum vertical reactions of the chain and the cables enable the loads borne by the barges 5, 7a and 7b to be calculated.

The following example provides an illustrative range of magnitude allowed by the method according to the invention.

For a pipe having a length of 27 nautical miles, a diameter of 27.5 inches and a bulk density sufficient for withstanding across currents of 2 knots, and for a frictional coefficient of 1, the required horizontal tractive force is of about 500 tons.

For a depth of 1,312 ft. and a height $h$ equal to 167 feet, the necessary cable has a length of 8,530 ft.

If the chain has a length of 820 ft., it should have a linear weight of 558 lb. per linear foot. The vertical reaction at the end of the chain does not exceed 208 tons; the tension in the chain does not exceed 542 tons.

The actual tension at the end of the pipe varies from 500 tons to 0 when the horizontal tension at the end of the chain varies from 500 to 100 tons, the frictional coefficient on the bottom being still supposed equal to 1.

These figures stress the necessity of using a heavy ballasted chain; the embodiment shown in FIGS. 3 to 5 enables such a chain to be readily and economically produced.

The method of the invention has the following specific advantages:

It provides the possibility of using a look-out turret of the "Galeazzi" type under conditions of safety which could not have been achieved if the cable were to be directly attached to the pipe.

The watchman has only to keep a watch over the head of the pipe which is the only fragile member of the unit. If the traction cable had been directly attached to this head, the turret could have been subjected to heavy damage by the whipping action of the cable in case of rupture. Such danger is inexistent when using a very heavy chain whose head is supported by two cables.

Should the traction cable be broken or should the towage winch be damaged, the pipe remains anchored by the entire weight of the chain which is in the given example 205 T. (or 208 metric tons).

The pipe will be accordingly subjected to the necessary stress to withstand the currents. Without even taking into consideration the possibility of one or both cables being broken, this advantage remains during the periods required for moving the anchors or the barges, during which periods no pull is exerted on the pipe. It would also be possible to double the cable 4 providing the vertical traction, so as to have a spare cable available to resume the tension after the rupture of the first towage cable.

By being dragged over the sea bottom, the chain prepares the ground for the subsequent passage of the pipe by destroying the obstructions which may damage the latter.

As aforesaid, this chain prevents the leading end of the pipe to be jammed, since any increase of the tension tends to separate the chain from the sea bottom whereas a cable dragged over a convex bottom tends to be dug therein.

By exerting the horizontal tension by means of two cables, the power of the required winches is practically divided by two.

The use of two traction cables further allows a better orientation of the head of the dragged chain, whose position is well indexed by that of the barge exerting the vertical tension, and since this tension is substantial, the barge will have a low sensitivity to the action of the wind and the currents.

It is to be understood that the invention is not restricted to the embodiments which have been described and illustrated merely by way of examples, and various changes can be made therein without falling outside the scope of the appended claims.

Having now described our invention what we claim as new and desire to secure by Letters Patent is:

1. A method of laying a submarine line of piping by towing it longitudinally along the bottom of a body of water in which said line of piping is being laid comprising, attaching a heavy chain to the leading end of said line of piping and attaching at least one pulling cable on a leading end portion of said heavy chain so that said heavy chain is intermediate the pulling cable and the line of piping being towed longitudinally, during the towing of said line of piping applying an upward force on said chain at a leading end thereof to develop therein a length of chain tangential to the bottom of said body of water along a length of arc forwardly of the point of attachment of said chain to said line of piping, said pulling cable extending forwardly and being towed in a position extending forwardly of said chain with said cable suspended by said upward force from a point below the surface of said body of water and at least during the towing of said line applying a force on a portion of said cable forwardly of said point in an upward direction to maintain said cable suspended clear of said bottom during towing of said line, applying a pulling force on said cable having a horizontal component in a vertical plane in which said line of piping is disposed and of sufficient magnitude to advance said line of piping longitudinally, said chain having a sufficient length of arc and sufficient weight per unit linear length to cause said length of chain to remain tangential to said bottom during application of said pulling force to said pulling cable, whereby the leading end of said line of piping constantly remains in contact with said bottom during longitudinal travel thereof and flexure thereof is avoided and said length of chain tangential to the bottom is dragged on said bottom forwardly of said line of piping to prepare the bottom for receiving said line of piping.

2. A method of laying a submarine line of piping by towing it longitudinally along the bottom of a body of water in which said line of piping is being laid comprising, attaching a heavy chain to the leading end of said line of piping and attaching at least one pulling cable on a leading end portion of said heavy chain so that said heavy chain is intermediate the pulling cable and the line of piping being towed longitudinally, during the towing of said line of piping applying an upward vertical force on a leading end of said chain to develop therein a length of chain tangential to the bottom of said body of water along a length of arc forwardly of the point of attachment of said chain to said line of piping, maintaining the leading end of said chain a given vertical distance from said bottom, said pulling cable extending forwardly and being towed in a position extending forwardly of said chain with said cable suspended by said upward force from a point below the surface of said body of water and at least during the towing of said line applying a force on a portion of said cable point in an upward direction to maintain said cable constantly suspended in operation clear of said bottom, applying a pulling force on said cable having a horizontal component in a vertical plane in which said line of piping is disposed and of sufficient magnitude to advance said line of piping longitudinally, said chain having a sufficient length of arc and sufficient weight per linear unit length to cause said length of chain to remain tangential to said bottom during application of said pulling force to said pulling cable, whereby the leading end of said line of piping constantly remains in contact with said bottom during longitudinal travel thereof and flexure thereof is avoided and said length of chain tangential to the bottom is dragged on said bottom forwardly of said line of piping to prepare the bottom for receiving said line of piping.

3. Apparatus for laying a submarine line of piping by towing it longitudinally along the bottom of a body of water in which said line of piping is being laid comprising, a heavy chain attachable in operation to the leading end of said line of piping and at least one pulling cable attachable on a leading end portion of said heavy chain so that said heavy chain is intermediate the pulling cable and the line of piping being towed longitudinally, means operable during the towing of said line of piping for applying an upward vertical force on said chain to develop therein a length of chain tangential to the bottom of said body of water forwardly of the point of attachment of said chain to said line of piping, the last mentioned means comprising means connectable to said chain and first floating means for suspending a leading end portion of said chain a given vertical distance from said bottom, said pulling cable being disposed in operation extending forwardly and being towed in a position extending forwardly of said chain with said cable suspended by said upward force from a point below the surface of said body of water and at least during the towing of said line applying a force on a portion of said cable forwardly of said point in an upward direction to maintain said cable suspended clear of said bottom, waterborne means for applying a pulling force on said cable to develop a horizontal component of force in a vertical plane in which said line of piping is disposed and of sufficient magnitude to advance said line of piping longitudinally, said chain having a sufficient length of arc and sufficient weight per foot of length to cause said length of chain to remain tangential to said bottom during application of said pulling force to said pulling cable, whereby the leading end of said line of piping constantly remains in contact with said bottom during longitudinal travel thereof and flexure thereof is avoided and said length of chain tangential to the bottom is dragged on said bottom forwardly of said line of piping to prepare the bottom for receiving said line of piping.

4. Apparatus according to claim 3, in which said waterborne means comprises a vessel.

5. Apparatus according to claim 3, further including means weighing down said chain to cause said chain to have said sufficient weight per unit linear length.

References Cited in the file of this patent

FOREIGN PATENTS 1,222,669    France _____ Jan. 25, 1960

OTHER REFERENCES

Engineering News-Record (publication), September 10, 1953, pp. 43, 44, 46 and 47.